Rice & Leach.
Driving-Bridle.
Nº 73042. Patented Jan. 7, 1868.
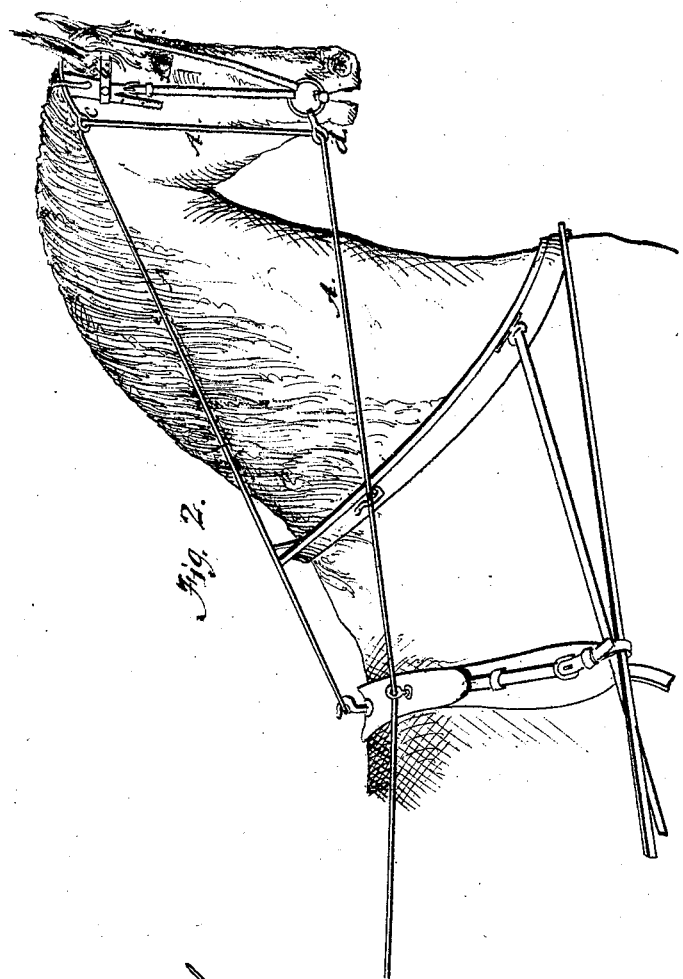
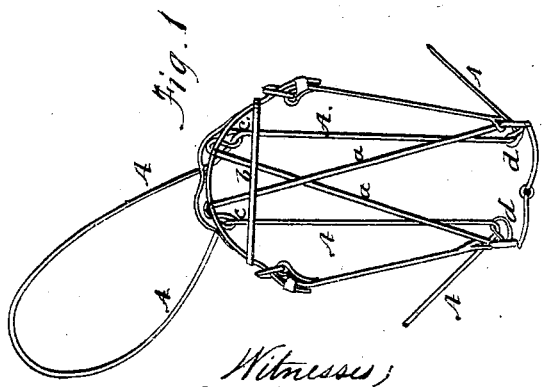
Witnesses:
Geo. H. Strong
J. S. Boone
Inventor:
Archibald Rice
& Leach.
By their Atty's
Dewey & Co.

United States Patent Office.

ARCHIBALD RICE AND LEWIS LEACH, OF FRESNO, CALIFORNIA.

Letters Patent No. 73,042, dated January 7, 1868.

IMPROVED DRIVING-BRIDLE.

*The Schedule referred to in these Letters Patent and making part of the same.*

TO ALL WHOM IT MAY CONCERN:

Be it known that we, ARCHIBALD RICE and LEWIS LEACH, of Fresno, county of Fresno, State of California, have invented an Improved Driving-Bridle; and we do hereby declare the following description and accompanying drawings are sufficient to enable any person skilled in the art or science to which it most nearly appertains to make and use our said invention or improvement without further invention or experiment.

The object of our invention is to provide an improved bridle, with a bit so constructed that the check-rein is done away with, or combined with the driving-rein, and only the two driving-lines employed. To accomplish this object, the headstall is made in the usual way, with the exception of two straps, which cross the forehead of the animal angularly above the eyes, and extend down to the rings of the bits, to which they are attached, the other ends being formed with loops. To the bit-rings are also attached loops. Through these loops the reins pass, the centre of which is placed in the check-hook of the saddle.

To more fully illustrate and describe our invention, reference is had to the accompanying drawings, and letters marked thereon, of which—

Figure 1 is a front view.
Figure 2 shows its attachment.
Similar letters indicate like parts in each of the figures.

$a\ a$ are two straps, which cross each other in front, beneath the band $b$, and extend down to the rings of the bit, to which they are attached. The other ends are formed by loops on to the gag-pulleys $c\ c$, at each side of the headstall, and, when the connection with the reins is made, they rest just above the upper portion of the jaw-bone of the animal. To each of the bit-rings pulleys $d\ d$ are attached.

The rein A consists of a single line, and, in adjusting it to the harness and bridle, it is first doubled in the centre, and placed in the post-hook of the saddle. Each end is then passed through the gag and bit-pulley, and returned through the hames and terret-rings, when the reins are ready for the driver's grasp.

By this arrangement, the check-rein is entirely done away with, or combined with the driving-reins in one piece, and the animal easily managed by the driver, giving him more advantage than by the use of the curb-bit, less the hurt to the horse's mouth; and this may be greatly increased by pulling more strongly upon the reins, which will tend to draw the bit more tightly against the sides of the mouth, vertically as well as laterally; and, by using this bridle, the driver has perfect control over the horse; and it is self-regulating, as, by slackening the hold, the horse will regulate the tension himself, and can eat or drink, reaching his head down to grass or water, thus obviating the necessity of alighting to uncheck him, as well as the danger of his running away while in the act of so doing.

We claim the combination and arrangement of the straps $a\ a$ with loops or pulleys $c\ c$ and $d\ d$, with the reins A hitched to the post-hook, and running through the loops or pulleys $c\ c$, and to the hames or saddle, substantially as described.

In witness whereof, we have hereunto set our hands and seals.

LEWIS LEACH, [L. S.]
ARCHIBALD RICE. [L. S.]

Witnesses:
WM. FAYMONVILLE,
OTTO FROELICH.